Dec. 19, 1967     F. A. WALDMANN     3,358,399
KITE WITH ROD AND TACKLE COMBINATION
Filed Jan. 22, 1965     2 Sheets-Sheet 1
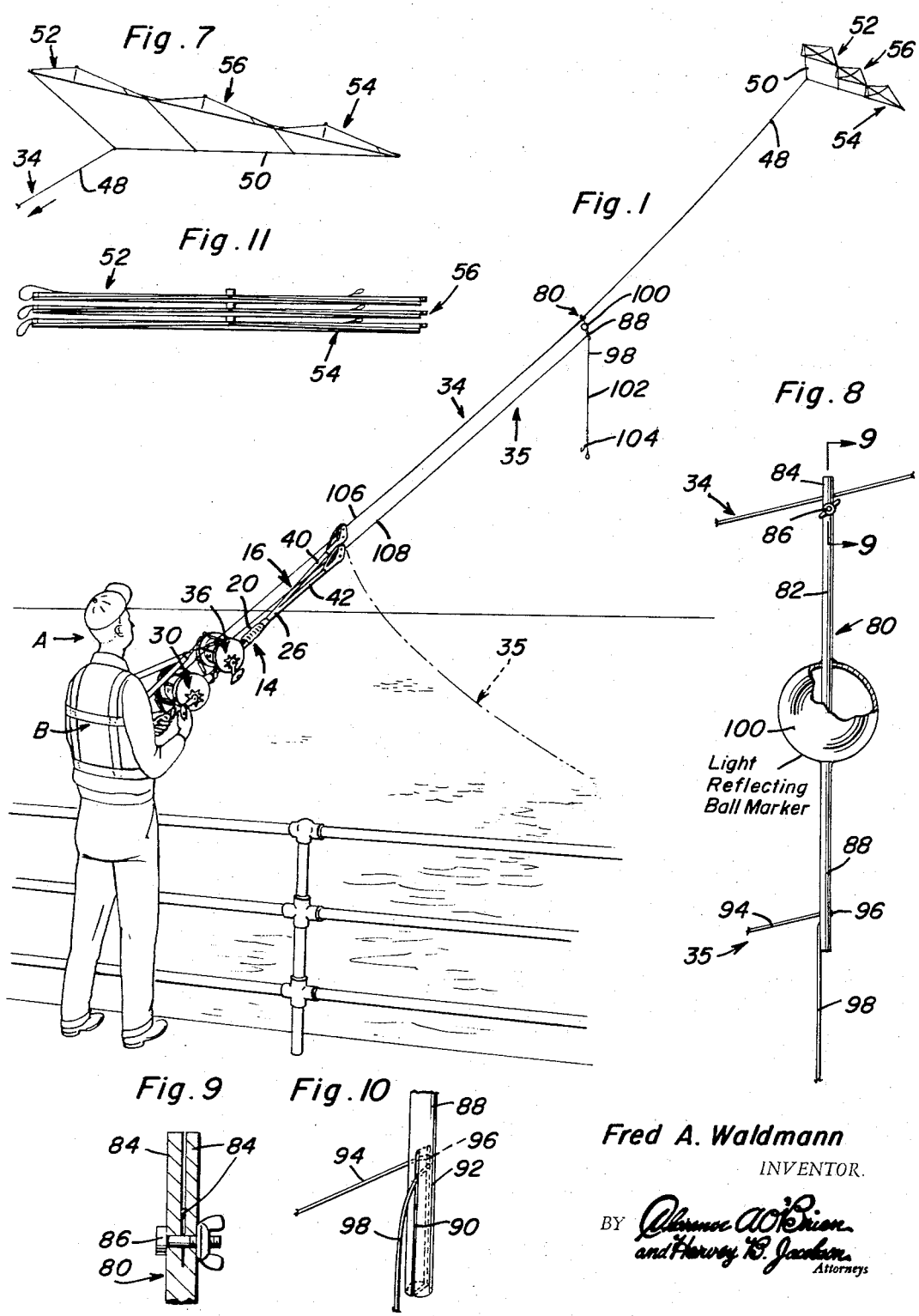
Fred A. Waldmann
INVENTOR.

Dec. 19, 1967     F. A. WALDMANN     3,358,399
KITE WITH ROD AND TACKLE COMBINATION
Filed Jan. 22, 1965     2 Sheets-Sheet 2
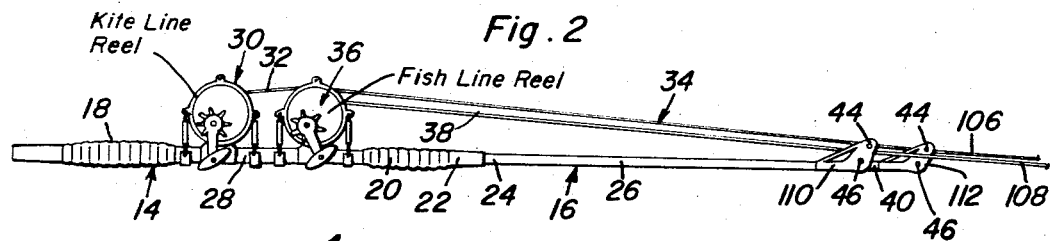
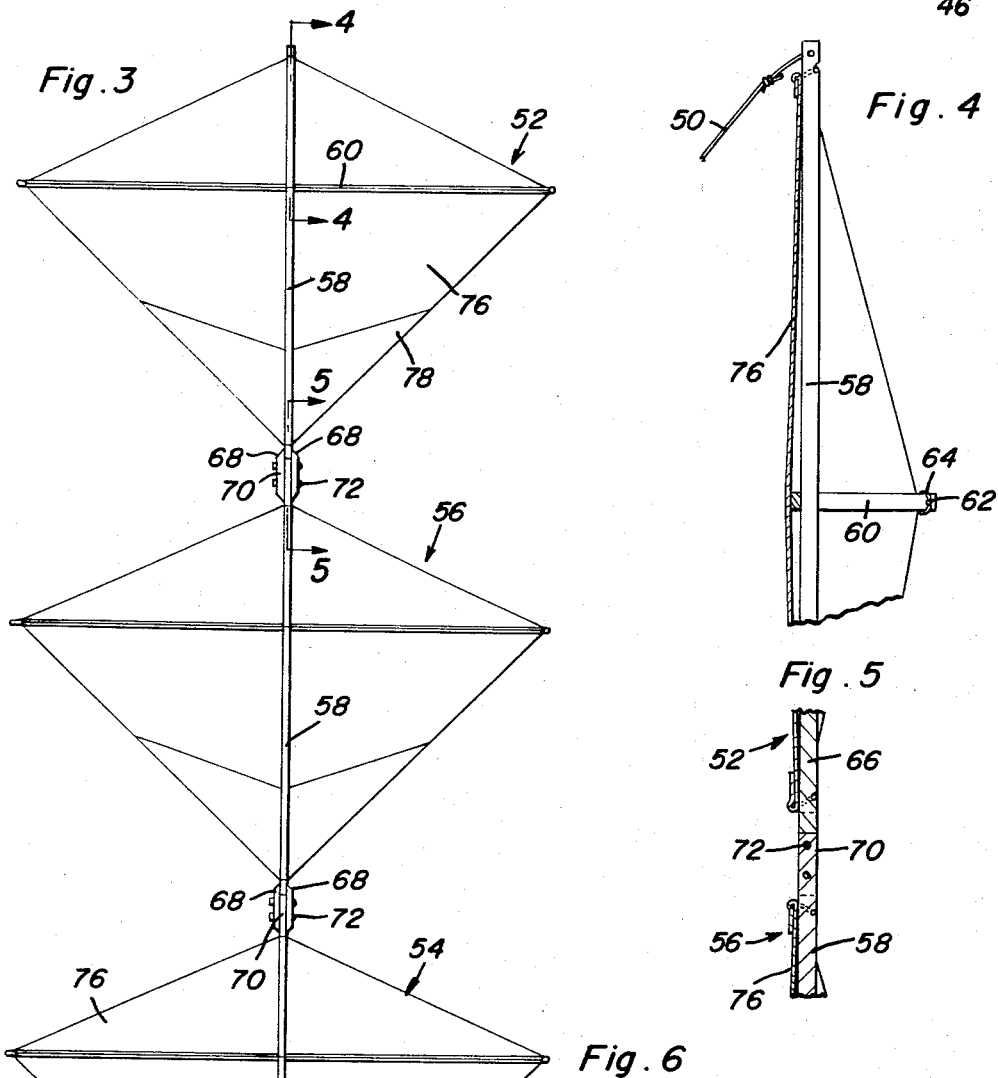
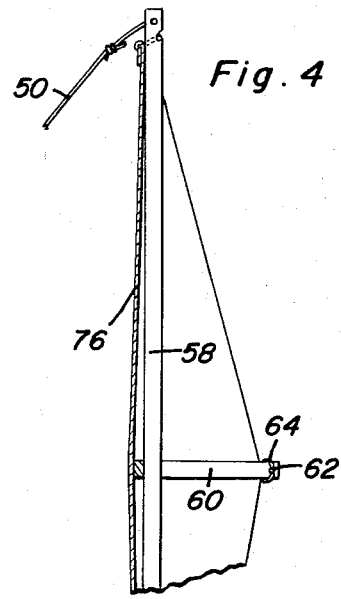
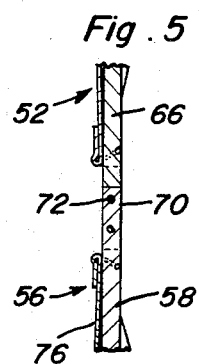
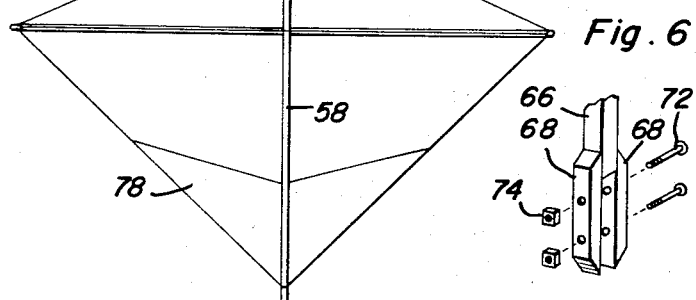
Fred A. Waldmann
INVENTOR.

United States Patent Office 3,358,399
Patented Dec. 19, 1967

3,358,399
KITE WITH ROD AND TACKLE COMBINATION
Fred A. Waldmann, Rte. 2, Box 166, Olive Street Road, Chesterfield, Mo. 63017
Filed Jan. 22, 1965, Ser. No. 427,337
7 Claims. (Cl. 43—4)

ABSTRACT OF THE DISCLOSURE

Kite fishing apparatus having a handle with forward and rearward reels serving to reel in and pay out independent lines, namely a fishing line and a glider-type kite line. A rod on the handle is provided with a V-shaped fork equipped with guide pulleys for the coacting lines. A stick is removably hung from the kite line. The outer baited end portion of the fishing line is detachably connected to a slotted portion of the stick and can be yanked free at will by tensioning the fishing line. The stick carries a light reflecting range indicating ball.

---

This invention relates to fishing tackle characterized, broadly construed, by a sectional knockdown fishing rod, two selectively controllable reels carried by the handling section of the rod, a kite whose line is wound on one reel, a fish line wound on the other reel, and trip means carried by the kite line and to which the forward baited end of the fish line is releasably connected.

The fishing tackle above briefly described is functionally designed and uniquely structurally adapted to serve the needs of a fisherman who cannot tolerate fishing from boats, cannot swim and is afraid of water and, under the circumstances, prefers to do his fishing from the shore, a pier, wharf or the like.

To the ends desired, a perfectly balanced three-in-one glider-type kite is provided and functions to carry its captive line out over the area of the water which is selected for the fishing expedition. The kite used requires a minimum wind velocity of 8 miles per hour up to 25 miles per hour. The three companion kites are separably hitched together and can be dismantled and compactly assembled for transporting and convenient storage. Each kite comprises a cruciform stick-type frame covered with plastic sheet material and sails well in normal wind and rain and withstands the weather. When once in the air and properly manipulated it stays aloft high or low in keeping with the wish of the angler and can be and often is payed out over the water for a mile or so. The kite line (usually 800 or more yards) is wound on a deep sea reel carried by the handle section of the fishing rod.

A second reel, also a deep sea type, is mounted on the handle section and the fishing line is controllably wound thereon. The forward baited end of the fishing line is payed out by the outgoing kite line. Accordingly, and to properly accomplish the desired result, means is detachably and adjustably connected with the kite line and is suspended therefrom and the baited end of the fishing line is looped and releasably hitched thereto and can be manually tripped at will and allowed to drop into the water at the desired fishing spot.

More specifically, the fish line hanger or suspension means comprises a simple rigid stick whose upper bifurcated end is adjustably hitched on the kite line. The lower end of this stick is formed with a slit and the fish line is properly looped and detachably jointed thereto so that it can be reeled in and freed from the stick at the place desired and thus landed at the distant fishing spot chosen by the angler.

The concept also features a range finding and distance marker which can be clearly seen by the angler from 300 up to 500 yards. To best achieve this result, a light and sunlight reflector or ball is used. Highly satisfactory action and good results have been and are being achieved by mounting this shiny ball on the median portion of the stick. The angler sights the place where he wishes to fish and by reeling in the fishing line he automatically trips the releasable line and it gravitates into the water.

In addition, novelty is predicated on the special construction of the twin-grip handle section of the two-part rod on which the reels are orderly and systematically mounted, plus the forward section which is not only detachable but is provided with a V-shaped or an equivalent fork whose arms or fingers are long and short, respectively, and terminate in sheath-like brackets having paired idling pulleys which orient and slidingly and guidingly position the kite line and fishing line for foolproof coordination and control.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of the rod and tackle combination with the glider-type sectional kite constructed in accordance with the present invention and showing the manner in which the overall assemblage is used;

FIGURE 2 is a view in side elevation showing the rod and reels on a larger scale;

FIGURE 3 is a view in elevation showing the overall kite assembled for use;

FIGURES 4 and 5 are fragmentary detail sections taken on the plane of section lines 4—4 and 5—5, respectively, of FIGURE 3;

FIGURE 6 is a fragmentary perspective view showing the manner in which the individual kites of the overall kite construction are separably joined together;

FIGURE 7 is a view in edge elevation showing the kite aloft;

FIGURE 8 is a view on an enlarged scale showing the kite line, fishing line and the suspension means with which the fishing line is separably connected;

FIGURE 9 is an enlarged detail section and elevation taken on the plane of the section line 9—9 of FIGURE 8; and FIGURE 10 is a similar view but in perspective showing the lower end of the hanger or suspension member and how the fishing line is releasably connected to the slotted end; and FIGURE 11 is a view in edge elevation showing the manner in which the several kites can be compactly arranged for transportation and storage.

Referring first to FIGURE 2, it will be seen that the rod is of two-part or sectional construction. The first section is denoted by the numeral 14 and the attachable and detachable section (the rod proper) is denoted by the numeral 16. The section 14 is provided with a rearward hand grip 18 and a forward hand grip 20, the latter terminating in a socket 22 into which the end portion 24 of the rod 26 is telescopingly fitted. The intermediate portion 28 of the handle section is provided with a rearward deep sea reel 30 of suitable construction and appropriately mounted and which has a portion 32 of the kite line 34 connected operatively thereto. The forward deep sea reel 36 is also suitably constructed and mounted on the part 28 and an end portion 38 of the fishing line is shown operatively connected thereto. It will be noted that the outer or forward end portion of the rod is of forked construction.

Referring now to FIGURE 1 it will be seen that the longer fork finger or arm is denoted at 40 and the complemental finger or arm at 42. Also, as better shown in FIGURE 2, each fork finger is provided with a channel-shaped or sheathlike bracket which is provided with freely turnable pulleys 44 and 46 providing guides for the respective kite line and fishing line. The outer or forward end 48 of the kite line 34 (FIGURE 1) is connected to the belly band or cord 50 of the triple unit kite. This kite is perfectly balanced and may be and preferably is a glider-type kite. This is to say, it is a three-in-one kite of the construction shown in FIGURE 3 and embodies an upper kite or unit 52, a lower kite or unit 54 and an intermediate or intervening kite or unit 56. Each kite is of a somewhat conventional form in that it includes a frame embodying a vertical stick 58 and a horizontal stick or frame member 60 preferably made of plastic material. The stick 58 is substantially rigid while the complemental one 60 is longitudinally bowable whereby to permit the shaping and tensioning string 62 to be looped and detachably mounted thereon as at 64 in FIGURE 4. The lower end portions of the vertical sticks of the upper and intermediate kites are of the same construction. One lower end portion, as shown in FIGURE 6, is denoted at 66 and is provided with a pair of attached connecting blocks or lugs 68 which accommodate the coacting upper end portion 70 of the complemental stick as shown in FIGURE 3. The several kites or sticks are assembled and secured together by bolts 72 and nuts 74 as shown in FIGURE 6. It follows that the kite is of a knockdown construction and the units or kites can be dismantled or assembled in compact and convenient form as shown in FIGURE 11 for transportation and storage. The component parts of the kites, including the covering 76, are made of appropriate sheet plastic and are substantially weatherproof. The lower end portion 78 is of a distinct color compared to the upper body portion 76 as suggested in FIGURE 3.

When in use the reel equipped rod 14 is attached and held on the fisherman A by a suitable balancing and supporting hardness B.

The means for supporting and tripping the fish line is denoted in FIGURE 8 and designated as a unit by the numeral 80. It comprises a plastic or suitable wooden elongated stick having an upper end portion 82 which is bifurcated to define furcations 84 which straddle and are attached to the kite line detachably and adjustably. Bolt and nut means 86 (FIGURE 9) is provided to attain this desired result. The lower end portion 88 of the hanger or suspension stick is provided with a slit or slot 90 opening through the extreme lower end and providing spaced members 92 for the attachment thereto of the cooperating detachable end portion 94 of the fish line. More specifically, the line is looped upon itself as denoted at 96 around the forward portion of the slotted stick and is then temporarily lodged, as at 98 in the slit. This suspension stick or hanger also provides support means for the plastic or equivalent light reflecting ball-type marker 100 which is shown in FIGURE 8. This marker is of a suitable size and appropriately coated with light reflecting material so that it can be seen by the fisherman when in the position indicated in FIGURE 1. The distance of this sighting ball may range anywhere from 300 to 500 yards out and over the water being fished.

In practice, the invention is used in the manner shown in FIGURE 1. This is to stay, the fishing rod made up of the sections 14 and 16 is mounted on the fisherman A by way of the hardness B. In actual practice, the harness may be provided on the forward side with a socket (not shown) capable of receiving the butt end of the handle part of the rod. The overall rod made up of both sections constitutes handling and control means for the reels and the two lines, the kite line 34 and the fishing line 35. The depending free end portion of the fishing line is denoted at 102 in FIGURE 1 and the sinker and baiting means is denoted generally at 104. It will be evident from FIGURE 2 that the portions 106 and 108 are slidingly and guidingly threaded between their respective guiding and retaining pulleys, that is on the sheathlike brackets 110 and 112, respectively. The grips or furcations 84 at the upper end of the hanger stick 80 are clampingly connected to a desired portion of the kite line while that portion of the kite line is within reach of the angler and then the kite line is unreeled and the kite is allowed to fly out the desired distance (a mile more or less). The bait will hang approximately 12 feet from the release loop 96 so that when the fisherman reaches the desired distance for releasing the bait, upon winding the fishing line reel the stick means 80 is caused to swing in an arc from the vertical depending position to an upwardly disposed position approximately parallel to the kite line and consequently the gradually tautened fishing line releases itself from the slitted lower end portions 90 and 92 in a seemingly evident manner. It follows that the loop 96 must come around the stick in the manner shown in FIGURE 10 in order to function and to avoid tangling and forming of a knot and failing to release satisfactorily.

As suggested, the kites may be disassembled into small package or compact form for carrying and storing as shown in FIGURE 11. Concerning the type of reels those which have been satisfactorily used are deep sea reels of any size (6.0 up). The featured fork rod may be inserted into any regulation deep sea rod with properly constructed connecting and coupling means. The three-in-one kite construction with the properly connected master sticks insures perfect buoyancy. It requires a minimum wind velocity of 8 miles per hour up to 25 miles per hour. The kite is made of plastic and will hold up in rain and wind. Once the kite is in the air, it stays in the air for high or low altitude as desired by the fisherman by manipulating the kite reel at hand. The silver-coated or shiny ball is made out of plastic and so coated that it may be seen by reflection, particularly from the sun. The fisherman sights the distance he wishes to fish and by winding the fishing line reel the fishing line release automatically releases the fishing line and it drops into the water in the manner shown in full and phantom lines, respectively, in FIGURE 1. It is believed that a careful consideration of the specification in conjunction with the view of the drawing will enable the reader to obtain a full and comprehensive understanding of the subject matter of the invention, the features, advantages and the manner of most satisfactorily achieving the desired end results. Accordingly, a more extended description is regarded as unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, handle means embodying forward and rearward longitudinally spaced hand-grips, a special purpose rod having a rearward end separably joined to a forward end of said handle means, the forward end of said rod having a V-shaped fork embodying rearwardly converging integrally connected fingers, one finger being longer than the other finger, each finger being provided at a free forward end with a channel-shaped sheath provided with upper and lower free turning guide pulleys, a kite line reel mounted on a median portion of said handle means proximal to said rearward hand-grip, a kite line wound on said reel and having a portion passing between the pulleys on the long finger and adapted to be connected with a kite, a fishing line reel also mounted on the handle means in front of the kite line reel and rearwardly of the forward hand-grip, and a fishing line wound on said fishing line reel and having a portion threaded between the pulleys on the short finger.

2. The structure defined in claim 1, and, in combination, kite means to which the forward end of said kite line is operatively connected, a vertically elongated hanger stick detachably and adjustably joined at an upper end to a predetermined portion of said kite line, means at the lower end of said stick separably connecting the forward end of the fishing line thereto, and a relatively large light reflecting and signalling ball mounted on said stick.

3. For use by a fisherman when fishing from the shore, pier or the like, fishing tackle comprising: a fishing rod having handle means at its inner end provided with first and second deep sea reels and provided at its outer end with a kite line guide oriented and coordinated with the first reel, a fish line guide oriented and coordinated with the second reel, a kite line reeled at its inward end on said first reel and passing outwardly through said kite line guide and provided at its outward end with a glider-type kite, a fish line reeled at its inward end on said second reel and having an outward portion slidingly threaded through and extending beyond said fish line guide and baited at its free outward end, a fish line suspending member removably and adjustably secured at an upper end to a predetermined median portion of said kite line and depending therefrom and having means at a lower free end to which a portion of said fish line is releasably connected, the outer end portion of said rod being provided with an inwardly converging substantially V-shaped fork having a pair of fingers, one short and the other one long, said long finger being provided at its outer terminal end with said kite line guide having a pair of sheathed pulleys between which the kite line is threaded and guided, the short finger likewise at its corresponding outer end terminating in said fish line guide having a pair of sheathed free turning pulleys between which said fish line is slidingly and guidingly threaded.

4. The structure according to claim 3, and wherein said suspending member comprises a rigid elongated stick having an upper bifurcated end, the bifurcations straddling the kite line and being detachably bolted thereto, the lower end being slitted and the coacting end of the fish line being looped upon itself and detachably connected thereto.

5. For use by a fisherman when fishing from the shore, pier or the like, fishing tackle comprising: a fishing rod having handle means at its inner end provided with first and second deep sea reels and provided at its outer end with a kite line guide oriented and coordinated with the first reel and a fish line guide oriented and coordinated with the second reel, a kite line reeled at its inward end on said first reel and passing outwardly through said kite line guide and provided at its outward end with a glider-type kite, a fish line reeled at its inward end on said second reel and having an outward portion slidingly threaded through and extending beyond said fish line guide and baited at its free terminal end, a vertically elongated hanger stick having an upper end detachably and adjustably connected to a predetermined portion of said kite line, the lower end of said stick having pull responsive clamp means separably connecting a forward end of the fishing line thereto and permitting the fishing line to be tautened by winding the fishing line in on the second reel in a manner to be forcibly and bodily detached from the lower end of the stick and to automatically gravitate to a selected fishing spot in the water being fished.

6. The structure defined in and according to claim 5 and wherein the upper end of said stick is bifurcated to define a pair of bifurcations, said bifurcations straddling the kite line and being detachably fastened thereto and thus providing the aforementioned detachable and adjustable connection between said upper end and said kite line, the clamp means at the lower end of said stick permitting the adjacent connectible portion of the fishing line to be manually looped around said lower end in such a manner that it is yanked free and released from the stick upon winding the fishing line on said second reel, and a relatively large light-reflecting and signalling ball mounted on a median portion of said stick and capable of being spotted and kept under observation by the angler while at a considerable distance from the position of the angler.

7. In combination, handle means embodying forward and rearward longitudinally spaced selectively usable handgrips, a special purpose rod having a rearward end separably joined to a cooperating forward end of said handle means, the forward end of said special purpose rod terminating in a substantially V-shaped fork embodying rearwardly converging fingers, each finger being provided at a free forward end with free turning guide pulley means, a kite line reel mounted on a median portion of said handle means adjacent to the rearward handgrip, a kite line wound on said kite line reel and having a forward portion passing between pulley means on one of said fingers, a fishing line reel also mounted on the handle means in front of the kite line reel and rearwardly of the forward handgrip, a fishing line wound on said fishing line reel and having a portion cooperatively associated with the pulley means on the other fork finger, glider-type kite means to which the forward end of the kite line is operatively connected, a vertically elongated hanger stick having an upper end detachably and adjustably joined to a predetermined portion of said kite line, said hanger stick having its lower end provided with a slit providing keeper fingers, a coacting forward end portion of said fishing line being freely looped around said lower end and detachably passed through said slit between said keeper fingers and capable of being tautened and pulled free in a manner to detach the fishing line and to allow the same to drop into the water which is being fished, and a light-reflecting and signalling ball mounted on a median portion of said stick.

References Cited
UNITED STATES PATENTS

| | | | |
|---|---|---|---|
| 2,231,053 | 2/1941 | Byrd | 43—24 |
| 2,749,648 | 6/1956 | Schneider | 43—4 X |
| 3,023,532 | 3/1962 | Gorenty | 43—43.12 X |
| 3,194,520 | 7/1965 | Kurkjian | 244—153 |
| 3,296,617 | 1/1967 | Rogallo | 244—153 X |

FOREIGN PATENTS 1,262,033  4/1961  France.

OTHER REFERENCES

The Star Magazine, Washington, D.C., Apr. 1, 1962, "Fishing With a Kite."

SAMUEL KOREN, *Primary Examiner.*

WARNER H. CAMP, *Examiner.*